(12) United States Patent
Stiattesi

(10) Patent No.: US 7,241,410 B2
(45) Date of Patent: Jul. 10, 2007

(54) PROCESS FOR MAKING A PRODUCT OF ARTIFICIAL ROCK

(75) Inventor: Laura Stiattesi, Florence (IT)

(73) Assignee: Opera Laboratori Fiorentini S.p.A. (IT)

( * ) Notice: Subject to any disclaimer, the term of this patent is extended or adjusted under 35 U.S.C. 154(b) by 303 days.

(21) Appl. No.: 10/772,975

(22) Filed: Feb. 5, 2004

(65) Prior Publication Data

US 2004/0175514 A1 Sep. 9, 2004

(30) Foreign Application Priority Data

Feb. 12, 2003 (IT) .............................. FI2003A0035

(51) Int. Cl.
*B29C 39/12* (2006.01)

(52) U.S. Cl. .................... 264/113; 264/255; 264/257

(58) Field of Classification Search ................ 264/113, 264/250, 255, 257
See application file for complete search history.

(56) References Cited

U.S. PATENT DOCUMENTS 3,055,148 A * 9/1962 Christy ...................... 52/309.1
3,836,619 A * 9/1974 Volent ......................... 264/131
5,443,774 A * 8/1995 Kluh et al. .................. 264/130

FOREIGN PATENT DOCUMENTS

JP 08229906 A * 9/1996
JP 11235899 A * 8/1999

* cited by examiner

*Primary Examiner*—Edmund H. Lee
(74) *Attorney, Agent, or Firm*—McGlew and Tuttle P.C

(57) ABSTRACT

The invention relates to a process for making a product of artificial rock and a product thus made for use, in particular, in aquariums, tanks, swimming pools and the like; the process comprises the following operating steps: carrying out a first deposition of a mixture of powdered aggregates, resin, additives, within a cast or mould; catalyzing the mixture of said first deposition; covering the surface thus obtained with isophtalic or bisphenolic polyester resin; carrying out a second deposition of powdered aggregates, resin, additives; covering the surface derived from the second deposition with a layer of structural component and with resin; polymerizing the intermediate product thus obtained covering the surface thus obtained with a layer of gel; polymerizing the product thus obtained; removing the product from the mould; subjecting the product to a heating treatment.

13 Claims, No Drawings

PROCESS FOR MAKING A PRODUCT OF ARTIFICIAL ROCK

The present invention refers to a process for making a product from artificial rock and a product thus made.

BACKGROUND OF THE INVENTION

A product of this type can be used in aquarium-building trade and, in general, in the manufacturing of rocky decorations, and other non-rocky motifs of medium and large dimensions, for use in aquatic and/or public swimming environments wherein stringent requirements of non-toxicity are to be met also after decades of service life.

At present, in the production of artificial rocky environments, use is made use of cement. Such solution has drawbacks such as the need of coloring, possible alteration of water's pH, poor resistance of the color over the time because of the contact with the water and the effects of shocks and other external agents action.

SUMMARY OF INVENTION

Among the objects of the present invention, one is to replace the cement in the construction of large rocky environments and in the decoration of facilities that are particularly difficult to reach, thereby overcoming the above said drawbacks.

One of the advantage of the present invention lies in that by using a mixture of resin, aggregates, and a series of auxiliary products for processing the resin, there is obtained a product which is realistic to the touch and sight, while eliminating the use of pigments that are likely to discolor and become altered over the time because of their exposure to heat or light; in particular, the specific formulation of the mix and the thickness by which it is produced, ensure a long life of the product in terms of strength and color.

Besides, the surface exhibited by a product made according to the invention can be scratched, pierced or abraded and, nevertheless, thanks to its structural characteristics and the high thickness of the mix by which it is made, the homogeneity of the same surface is maintained even when the latter is subjected to mechanical shock or wear.

A further advantage is that the absence of surface's coloring maintains the product unaltered over the time also when it is fully immersed into the water or merely subject to a current of running water, either fresh or salt.

Yet another advantage stems from the mechanical resistance to the abrasion, and to bending and tensile strength, thereby allowing the use of rock also in cases that imply structural withstanding capacity against any possible mechanical stress.

Moreover, the aggregates of the mix are selected free of impurities to such a degree that the use of regenerated artificial rock in aquarium construction—contrary to the cement—does not alter the pool's pH, thereby leaving the physico-chemical parameters of the water unaltered.

Another important factor to be considered when making rocky decorations for aquariums is the grow of algae which enrich the aspect of the expository tank: a careful selection of the quality and physico-chemical proprieties of the aggregates will favour a better and faster colonization of the regenerated rock by red, calcareous encrusting algae than with rocks made from cement or painted plastic materials. In this way, it is possible to build an excellent sub layer for the colonization of sessile plants and animals.

The other high advantage of using regenerated rock is that it can be supplied in panels of any dimension and shape to overcome any logistic staging problem; the relatively light panels allow carrying out any setting in environments difficult to access; care in the details and shapes will make the product a true copy of the real environment.

These and other advantages and characteristics of the invention will be best understood by anyone skilled in the art from a reading of the following description given as a practical exemplification of the invention, but not to be considered in a limitative sense.

DETAILED DESCRIPTION OF THE INVENTION

The present process is substantially based on mixing an isophtalic or bisphenolic polyester resin with aggregates of various nature and granulometry, derived from working marble, granite, stone in general, quartz,—selected according to their color, strength and intended use in building aquarium and the like—in order to produce synthetic rock panels to be laid on waterproof rolled sections, said panels being of any possible modular shape, light-weight, waterproof and constructed in a manner that allow them to be transported and to withstand high loads, while being identical to the touch and sight to rocky surfaces of various morphology and color.

In order to manufacture a product that will best reproduce the characteristics of a given type of rock, it is necessary to make a careful identification of the rocks to be imitated. This stage of the process may comprise: localizing the geographical area of the rock, analyzing the typical morphology of the rock in situ, analyzing the atmospheric and climatic conditions in order to determine the type of wear due to water and wind erosion, as well as other possible conditions; analyzing the habitat in general. Samples may also be collected for the analysis of the mineral composition of the rock in relation to the color, shape, texture and color variations.

Afterwards, a mixture is made of the selected aggregates which is able to imitate said color, chromatic variations, texture and shape. The material can be preferably chosen among those indicated below and resulting from rock crushing:

raw material, made up of periodite rock reach in olivine minerals, which is crushed, milled, selected and classified into corns, sands and powders:

isomorphous mixture of magnesium silicates (phosphorite) and iron silicates (fayalite) $(Mg, Fe)_2SiO_4$;

marble powder ($CaCO_3$ and $MgCO_3$) in any color and granulometry, washed, dried in oven, riddled and divided according to its granulometry.

Thereafter, an analysis is made of the final setting of the regenerated rock, that is, of the load that the rock is to withstand, by evaluating the mechanical stress in tension and bending, and the degree of erosion caused by chemical agents, while observing the animals or persons usually present in the environment, the water nature and any other factor that makes integral part of the design.

Then the mixtures are formulated by selecting the aggregates, resins and resin's additives, thixotropic agents, operating temperatures, type of glass fibers, while considering the general working conditions and assembly problems.

The chosen resins are of polyester, and can be preferably identified in the following types: bisphenolic polyester resin and unsaturated isophtalic resin.

The bisphenolic polyester resin is a styrene solution of flexible polyester resin composed of bisphenol A fumarate propoxilate and pre-accelerating agent for polimerization at ambient temperature. The resin combines an exceptional resistance against a plurality of corrosive agents in aqueous solution, with good properties of mechanical resistance versus temperature, high flexibility and improved shock-resistance characteristics. The rolled sections based on isophtalic resin are approved for applications with drinking water to foodstuff in general. Common applications are for the construction of any type of product in glass-fiber reinforced plastics for chemical facilities such as, storing tanks, process equipment, tubing, conduits, chimneys, and for coatings on steel and concrete. The use of the above said resin for rock-supporting stratifications ensures, besides an excellent resistance of the same stratifications against the chemical agents present especially in seawater, a reduced structural thickness with respect to common resins, while maintaining the same mechanical resistance properties in bending and compression. The special composition of the resin makes it particularly suited for molding processes with high-temperature polimerization.

The isophtalic resin is an unsaturated isophtalic, thixotropic, stirene-processed, pre-accelerated resin which the presence of a color-changer. additive. It exhibits glass fibers of optimal wet ability, excellent hardening also on thin layers, and its thixotropic nature allows it to be easily worked also in a vertical plane. The high strength, increased HDT (High Deflection Temperature) and the excellent resistance to water, make this kind of resins suitable for naval constructions and for swimming pools and sanitary facilities; accordingly, these resins show to be suited for making products that are plunged in salt water and are formed with considerable inert fillers. The good wetting power allows the obtainment of rolled sections with high content of glass.

Following the formulation of the mixtures, a cast of the original is made, that is, a silicon cast in situ of the rocks to be imitated. A form is made in resin for moulds, which resin is reinforced with unsaturated polyester resin, such as for naval constructions, and whose formulation is suited for reinforced plastics sections requiring an easy workability and glass fibers with optimal wet ability and low marking.

A mould is then made for the production of panels in synthetic and "regenerated" rock.

The mould is provided with a first coat of about 3–4 cm (thickness) of a mixture consisting of: aggregates of various granulometries (0, 00, 000: in practice, the powders are of different granes and up to 1–2 mm in diameter); a resin (selected on the base of its chemical properties and capacity of being filled with aggregates); additives (selected according to the catalysis proportion, presence of silica powder to make the mix thixotropic; glass fibers to make it structural, etc.). The laying of the coat is a single, hand-made operation which is carried out by the operator who, on the base of his/her chromatic perception and according to the shape of the cast, causes the mixtures to result variously shaded so that the surface will appear non homogeneous and with a realistic aspect of chromatic variation, likewise a real rock: many colors and minimum or evident variations of tone and color).

Afterwards, the esothermic step of the catalysis is allowed to complete, followed by a first cooling, for a total of 120 minutes approximately. The whole surface is then covered by a film of pure isophtalic or bisphenolic polyester resin to ensure the setting of the subsequent mix.

A second coat of about 3–4 cm of a mixture on powdered aggregates, resin and additives is then laid in a single deposition to ensure a perfect adherence of the waterproof and structural stratification.

The next step is the stratification of two successive layers of glass fiber (450 gr/cm$^2$) and a deposition of glass C and pure resin. With glass C is meant a film of glass fiber very light but compact, having a waterproofing function. To this end, the known product designated M524-C64 can be used.

A first, total polymerisation of the product, that is, the hardening of the resin as determined by the chemical reaction of the peroxide with the resin, is then carried out.

Throughout the whole surface thus obtained a layer of white "Gelcoat" is laid. By way of example, the product known by the name NEOGE ISY gelcoat ISO-Orto, can be used.

Throughout the whole surface thus obtained a layer of black "Gelcoat" is laid. For this operation use can be made of a product similar to the preceding one, with the addition of paraffin.

A second total polimerization of the product is then carried out, and the same product is withdrawn from the silicone mould.

Finally, a further polimerization is allowed to complete in about 120 seconds, before processing the product within an oven for 5 hours, three of which at a temperature of 100° C. and the others at 60° C.

The molding step is completed by a washing of the product with water at 100° C. and stem.

The panels of regenerated rock thus obtained are assembled so as to create forms suited for the staging: in this step, the panel can be cut, joined to other pieces to form new ones, while any other manipulation may be performed as necessary to give the piece the desired shape.

Once the panels have been given a suitable shape, and being associated with others, the junctions are plastered with plastic putty made by mixing aggregates and especially selected resins to be subsequently modeled likewise a rock. The characteristic of such putty allows the operator to build rock's details of small and medium dimensions capable of creating a continuity between the material being cast and the one being modeled: the synthetic rock panel will result perfectly like the desired form and aesthetically harmonious. The putty being used may be of the same material as that of the panels, without using fibers.

It is understood that panels of different dimensions and shapes can also be made, either starting, as in the process above described, from the silicone cast of the original, with portions possibly integrated by lab-modeled parts, and using the moulds previously built. The panels could be lab-assembled beforehand according to the shapes, dimensions and characteristics of the general design, with a pre-assembly finishing made with malleable paste of the same color as the general mix of the rock. After having assembled the work in the laboratory, the panels can be disassembled and subjected to a post-hardening in oven for an average time of five hours, with three hour-baking at 100° C. to achieve the final dispersion of the styrene, and washed with water at 100° C. and steam.

The assembly of the panels at the final location will be carried out by using also self-bearing panels or, when necessary, a support structure made, for example, of electro-welded iron, steel, resin or other material depending on the location and requirements.

On the panels assembled in their final configuration, a joining stratification is performed. The stratification allows joining the panels. by means of a coating of glass fiber and epoxy resin.

The visible junction lines of the panels can be concealed with a plastic putty made from a mixture of aggregates, epoxy resin (this for avoiding the use of polyester resin which, in order to be fully non-toxic, must be subjected to a post-cycle of hardening, whereas the epoxy allows a polimerization at ambient temperature with no risk for the health of persons or animals), and resin additives.

It should be pointed out that the formulation of a mixture allowing the realization of realistic objects, while being extremely resistant, has made it possible to implement a whole work process able to create small dimensions products as well as monumental works, by maintaining unchanged the quality of the product which results a true copy of the original.

By way of example, a product of synthetic rock made according to the present invention, and having an extension of one square meter, may have the following average composition:
- gr. 9000 of resin, such as of "SYNOLITE 0280-I-1" type;
- gr. 180 of catalyst, such as of PEREXTER B18" type;
- gr. 14000 of aggregates consisting of calcium and quartz;
- gr. 100 of thixotropic thickening agent, such as of "CAB-O-SIL FUMED SILICA" type;
- gr. 1350 of glass fibers, such as of "MAT POWDER" 450 gr/m$^2$ type;
- gr. 400 of structural glass fiber for plastics rolled sections, such as of "ROVING AGIMAT" 800/300 GR/M$^2$ type;
- gr. 500 of structural glass fiber for plastics rolled sections, such as of "R63SX1 CHBPPED STRAND" type;
- gr. 1000 of resin filled with fine aggregates and pigment for finishing and waterproofing applications, such as of "NEOGEL ISI 8378-W-0100" in fabric yarn type;
- gr 40 of waterproofing agent, such as liquid paraffin.

With this formulation, the total weight per square meter of product will be of 26570 grams.

Practically, all the manufacture details may vary in any equivalent way as far as the amount, dimensions, disposition, nature of the used materials are concerned, without nevertheless departing from the scope of the adopted solution idea and, thereby, remaining within the limits of the protection granted to the present patent.

What is claimed is:

1. A process for making artificial rocks, that comprises the following operating steps:
   a. carrying out a first deposition of a mixture of powdered aggregates, resin, additives, within a cast or mold;
   b. catalyzing the mixture of said first deposition;
   c. covering a surface thus obtained by step b with isophtalic or bisphenolic polyester resin;
   d. carrying out on the surface obtained by step c a second deposition of powdered aggregates, resin and additives;
   e. covering a surface derived from the second deposition with a layer of structural component and with resin;
   f. polymerizing an intermediate product thus obtained by step e;
   g. covering a surface thus obtained by step f with a layer of gel;
   h. polymerizing a product thus obtained by step g;
   i. removing the product obtained by step h from the cast or mold;
   j. subjecting the product obtained by step i to a heating treatment.

2. Process according to claim 1, wherein the step a is carried out by means of a cast in silicone of a rock to be reproduced by the construction of a reinforced resin mould.

3. Process according to claim 1, wherein the deposition of steps a and/or d consists of a layer of mixture whose thickness ranges from 0.5 to 10 cm.

4. Process according to claim 3, wherein the layer of mixture has a thickness between 3 and 4 cm.

5. Process according to claim 1, characterized in that the aggregates used for the mixture of the steps a and/or d have a variable granulometry and a diameter less than 5 mm and greater than 0 mm.

6. Process according to claim 5, wherein the granulometry of the aggregates is variable and their diameter is less than 2 mm and greater than 0 mm.

7. Process according to claim 1, wherein the resin used in the steps a and/or d is an isophtalic or bisphenolic polyester resin.

8. Process according to claim 1, wherein on performing the steps a and/or d the additives are selected from the group consisting of a thickener, structural glass fibers, and various aggregates.

9. Process according to claim 1, wherein on performing step e two successive layers of glass fiber and resin are used.

10. Process according to claim 1, wherein the step g provides a covering with a first layer of white gel-coat and second layer of paraffined black gel-coat.

11. Process according to claim 1, wherein the step j provided for a treatment in oven for a time of about five hours, three of which at 100° C.

12. Process according to claim 1, wherein the product obtained by step j is washed after the step j with water at about 100° C. and/or with steam.

13. A process for making artificial rocks, the process comprising the steps of:
   in a first deposition step, depositing a mixture of powdered aggregates, resin and additives within a mold;
   catalyzing the mixture deposited in the mold;
   in a first covering step, covering a surface obtained by catalyzing with isophtalic or bisphenolic polyester resin;
   in a second deposition step, depositing powdered aggregates, resin and additives on a surface obtained in said first covering step;
   in a second covering step, covering a surface obtained by said second deposition step with a layer of structural component and with resin;
   in a first polymerizing step, polymerizing an intermediate product obtained form said second covering step;
   in a third covering step, covering a surface obtained by said first polymerizing step with a layer of gel;
   in a second polymerizing step, polymerizing the product obtained from said third covering step;
   removing the product obtained by said second polymerizing step from the mold; and heating the removed product.

* * * * *